United States Patent
Celebisoy

(10) Patent No.: US 9,360,991 B2
(45) Date of Patent: Jun. 7, 2016

(54) THREE-DIMENSIONAL ICONS FOR ORGANIZING, INVOKING, AND USING APPLICATIONS

(75) Inventor: Berk C. Celebisoy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1053 days.

(21) Appl. No.: 13/084,522

(22) Filed: Apr. 11, 2011

(65) Prior Publication Data

US 2012/0260217 A1   Oct. 11, 2012

(51) Int. Cl.
G06F 3/048     (2013.01)
G06F 3/0481    (2013.01)
H04M 1/725     (2006.01)
G06F 3/0488    (2013.01)

(52) U.S. Cl.
CPC .......... *G06F 3/04815* (2013.01); *G06F 3/0488* (2013.01); *G06F 3/04817* (2013.01); *H04M 1/72597* (2013.01); *G06F 2203/04802* (2013.01)

(58) Field of Classification Search
USPC ....................................................... 715/836
See application file for complete search history.

(56) References Cited

U.S. PATENT DOCUMENTS

| 5,297,032 | A | 3/1994 | Trojan et al. |
| 5,303,388 | A | 4/1994 | Kreitman |
| 5,321,750 | A | 6/1994 | Nadan |
| 5,339,392 | A | 8/1994 | Risberg et al. |
| 5,432,932 | A | 7/1995 | Chen et al. |
| 5,452,414 | A | 9/1995 | Rosendahl et al. |
| 5,678,015 | A | * 10/1997 | Goh ............... G06F 3/04815 345/419 |
| 5,724,492 | A | 3/1998 | Matthews, III |
| 5,819,284 | A | 10/1998 | Farber et al. |
| 5,959,621 | A | 9/1999 | Nawaz et al. |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |

(Continued)

FOREIGN PATENT DOCUMENTS

| CN | 103460171 A | 12/2013 |
| JP | 2002288690 | 10/2002 |
| WO | WO 99/26127 | 5/1999 |

OTHER PUBLICATIONS

Waterworth et al., "VR Management Tools: Beyond Spatial Presence," CHI '94, Boston, Massachusetts, <http://www8.informatik.umu.se/~jwworth/VRManTools.pdf>, 2 pages, Apr. 24-28, 1994.

(Continued)

*Primary Examiner* — William Bashore
*Assistant Examiner* — Henry Orr
(74) *Attorney, Agent, or Firm* — John Jardine; Judy Yee; Micky Minhas

(57) ABSTRACT

Disclosed herein are representative embodiments of three-dimensional icons that can be used to display a wide variety of information in an efficient manner and that can effectively organize a large number of applications on the display of a computing device (e.g., on the display of a mobile device). In one exemplary embodiment disclosed herein, an icon is associated with one or more applications, and a first panel of the icon is displayed. An update to the first application is received. Based on the update to the first application, the icon is rotated in three dimensions and a second panel of the icon is displayed with an indication of the update to the application.

21 Claims, 12 Drawing Sheets

(56) References Cited

U.S. PATENT DOCUMENTS

| | | |
|---|---|---|
| 6,449,638 B1 | 9/2002 | Wecker et al. |
| 6,456,334 B1 | 9/2002 | Duhault |
| 6,510,553 B1 | 1/2003 | Hazra |
| 6,597,358 B2 | 7/2003 | Miller |
| 6,710,788 B1 | 3/2004 | Freach |
| 6,724,403 B1 | 4/2004 | Santoro et al. |
| 6,807,558 B1 | 10/2004 | Hassett et al. |
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,346,373 B2 | 3/2008 | Kim |
| 7,376,907 B2 | 5/2008 | Santoro et al. |
| 7,933,632 B2 | 4/2011 | Flynt et al. |
| 7,987,431 B2 | 7/2011 | Santoro et al. |
| 8,132,120 B2 * | 3/2012 | Stallings et al. ............ 715/848 |
| 8,677,277 B2 * | 3/2014 | Stallings et al. ............ 715/848 |
| 2001/0028369 A1 * | 10/2001 | Gallo .................. G06F 3/04815 715/848 |
| 2001/0041047 A1 * | 11/2001 | Kawajiri ................ H04N 5/782 386/231 |
| 2002/0033849 A1 * | 3/2002 | Loppini .............. G06F 3/04815 715/848 |
| 2002/0067378 A1 | 6/2002 | Abdelhadi |
| 2002/0069415 A1 | 6/2002 | Humbard |
| 2003/0142136 A1 * | 7/2003 | Carter ................. G06F 3/04815 715/782 |
| 2004/0221243 A1 * | 11/2004 | Twerdahl ................ G06F 3/016 715/834 |
| 2005/0022131 A1 * | 1/2005 | Saint-Hilaire .......... G06T 13/80 715/740 |
| 2006/0190833 A1 | 8/2006 | SanGiovanni et al. |
| 2009/0217206 A1 * | 8/2009 | Liu .................... G06F 3/04817 715/846 |
| 2010/0058248 A1 | 3/2010 | Park |
| 2010/0093400 A1 | 4/2010 | Ju |
| 2010/0169836 A1 * | 7/2010 | Stallings ............. G06F 3/04817 715/848 |
| 2010/0293056 A1 | 11/2010 | Flynt et al. |
| 2010/0315417 A1 | 12/2010 | Cho et al. |
| 2011/0065478 A1 | 3/2011 | Kim et al. |
| 2011/0209092 A1 * | 8/2011 | Tarte ..................... B60K 35/00 715/830 |
| 2011/0225547 A1 | 9/2011 | Fong et al. |
| 2012/0079431 A1 * | 3/2012 | Toso ................. G06F 17/30554 715/836 |
| 2012/0133652 A1 * | 5/2012 | Stallings et al. ............. 345/419 |
| 2012/0260217 A1 * | 10/2012 | Celebisoy .................... 715/836 |

OTHER PUBLICATIONS

Wilson, "Viliv S5—A Review of the Viliv S5," Laptop, <http://www.laptopmag.com/review/laptops/viliv-s5.aspx>, 4 pages, Aug. 24, 2009 (Retrieved Date: Feb. 28, 2011).

What the Tech, "Mobile Review: Samsung Omnia II," <http://www.whatthetech.com/2010/04/06/mobile-review-samsung-omnia-ii/>, 4 pages, Apr. 6, 2010 (Retrieved Date: Feb. 28, 2011).

Cha, "Cube Interface," Samsung Omnia 2 photos—CNET Reviews, <http://reviews.cnet.com/2300-12261_7-10001691-5.html>, 4 pages, Oct. 8, 2009 (Retrieved Date: Feb. 28, 2011).

International Search Report and Written Opinion, International Application No. PCT/US2012/032930, Oct. 31, 2012, 8 pages.

Office Action Issued in European Patent Application No. 12771736.1, Mailed Date: Feb. 6, 2015, 6 Pages.

Search Report Issued in European Patent Application No. 12771736.1, Mailed: Nov. 17, 2014, 3 Pages.

Office Action Issued In China Patent Application No. 201280017955.7, Mailed Date: Oct. 10, 2015, 14 Pages.

Office Action Issued in Japanese Patent Application No. 2014-505220, Mailed Date: Feb. 9, 2016, 3 Pages.

* cited by examiner

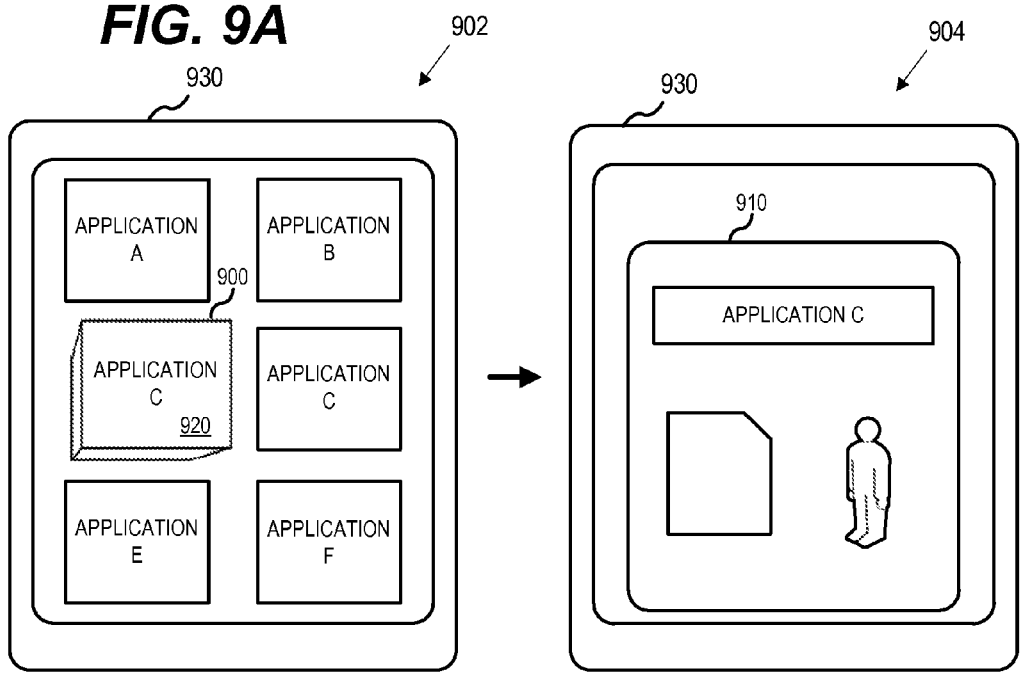
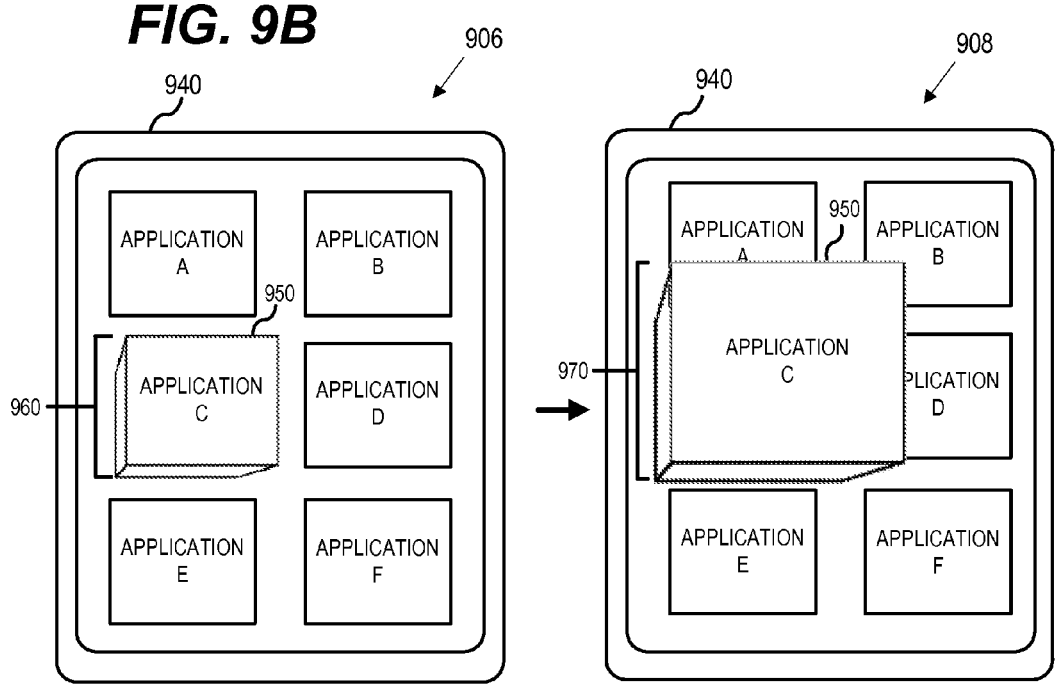

THREE-DIMENSIONAL ICONS FOR ORGANIZING, INVOKING, AND USING APPLICATIONS

FIELD

The present application relates to user interfaces and, in particular, to three-dimensional icons for use with a user interface.

BACKGROUND

Mobile devices have become ubiquitous in today's world and are capable of performing a wide variety of functions. The various functions of a mobile device are usually invoked or offered through applications stored on or accessed using the device. The number of applications available for use on a device is growing rapidly, making it increasingly difficult for a mobile device user to organize, launch, and use the various available applications quickly and easily. Furthermore, mobile devices continue to shrink in size, making the available display space for organizing, launching, and using the available applications even more limited. Although traditional user interfaces can be used to access the various functionalities and content available on a mobile device, such user interfaces are not well suited for the mobile device environment. Furthermore, traditional icons used to represent the available applications on a computing device have extremely limited functionality and purpose.

SUMMARY

Among other innovations described herein, this disclosure presents various tools and techniques for displaying and using icons to represent more information and functionality than previously possible. For instance, certain embodiments of the disclosed technology use three-dimensional icons that can be rotated to show a user a wide assortment of information, updates, and other functions in a compact and efficient manner.

In one exemplary technique described herein, an icon is associated with one or more applications, and a first panel of the icon is displayed. An update to the first application is received, and, in response to the update, the icon is rotated in three dimensions to display a second panel of the icon. In this embodiment, the second panel includes an indication of the update to the application.

In another exemplary technique described herein, a first application is assigned to a first panel of an icon, and a second application is assigned to a second panel of the icon. Also, a priority is assigned to the first panel of the icon. An update to a second application is received and, based on the update to the second application, the icon rotates in three dimensions to display the second panel. The second panel further displays an indication of the update. In certain implementations, the first application assigned to the first panel is then updated. Based on the priority assigned to the first panel, the icon rotates in three dimensions to again display the first panel with an indication of the update. The first application can be launched in response to user interaction associated with the first panel displaying the indication of the update to the first application.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

BRIEF DESCRIPTION OF THE DRAWINGS

FIG. 9A is a schematic diagram illustrating an exemplary icon for launching an application.

FIG. 9B is a schematic diagram illustrating an exemplary icon increased in size.

DETAILED DESCRIPTION

Figure 1:
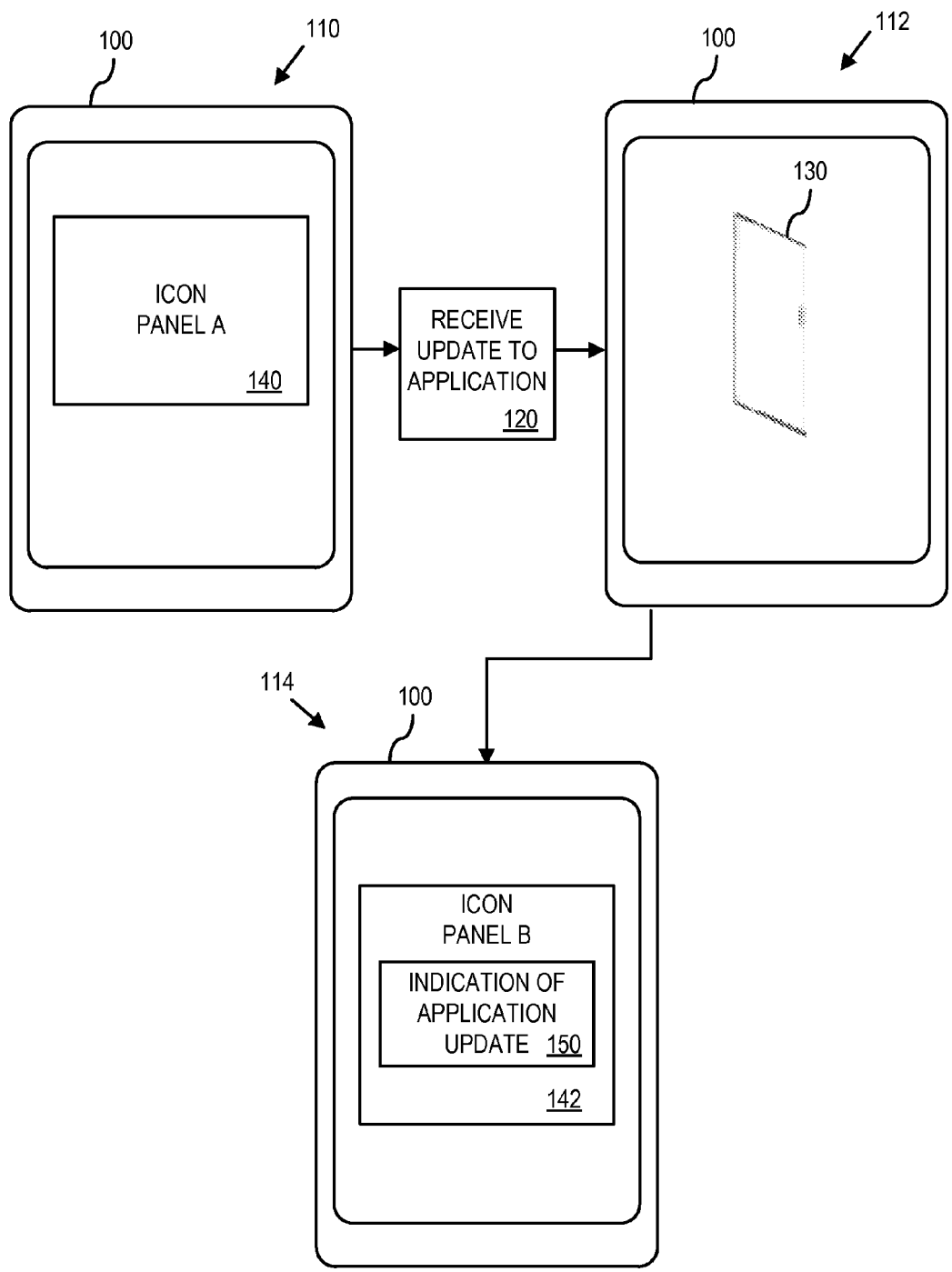
FIG. 1 is a schematic diagram illustrating an exemplary technique for rotating an icon in three dimensions.

FIG. 1 is a schematic diagram illustrating an exemplary technique for displaying the three-dimensional rotation of an icon on a display of a computing device 100 (such as a screen of a mobile device). In this context, the display is a two-dimensional display and the icon is a two-dimensional representation of an object that can be rotated in three dimensions. As more fully explained below, the icon can represent a three-dimensional object (e.g., a cube, a sphere, a cylinder, a polygon, a polyhedron, or any such three-dimensional object), a two-dimensional object (e.g., a tile), or any mixture thereof (e.g., a cube with flippable tiles for sides). Similarly, the rotation of the three-dimensional icon is meant to refer to the appearance or representation of three-dimensional rotation on a two-dimensional display.

In general, icons are small graphic symbols (usually simple pictures) that denote programs, commands, data files, etc. in a graphical user interface. For example, an icon can be used to launch an application (e.g., Microsoft® Word®). Icons can also be used to display content (e.g., content associated with a particular application, such as a day of the week for a calendar application, a temperature for a weather application, a stock price for a stock watching application, a score of a sporting event for a sports application, and other such content). Further, icons can be animated and dynamically updated.

In the illustrated embodiment, and at 110, the computing device 100 displays a first panel 140 of an icon. For example, the first panel 140 can display an image for an application that can be launched using the icon. At 120, the computing device 100 receives an update to an application 120 associated with the icon. For example, the icon can be associated with an email application, and the email application can receive an email as an update to the application. Based on the update to the application, the system 100 can rotate the icon in three dimensions 130. For example, as shown at 112, the icon can rotate in three dimensions automatically when the application associated with the icon is updated. At 114, the display of the computing device 100 displays a second panel 142 of the icon. For example, the icon can be animated to rotate to reveal the second panel 142. Furthermore, in the illustrated embodiment, the second panel includes an image or indication 150 associated with the update (e.g., an image associated with the update to the email application). For example, the second panel 142 can display a subject line or sender of the email received by the application as an update. Thus, in response to an update to an application, an icon associated with the application can be rotated to reveal a different panel having some information about the update. Although only two panels of the icon are described above, the icon can have any number of panels.

Figure 2:
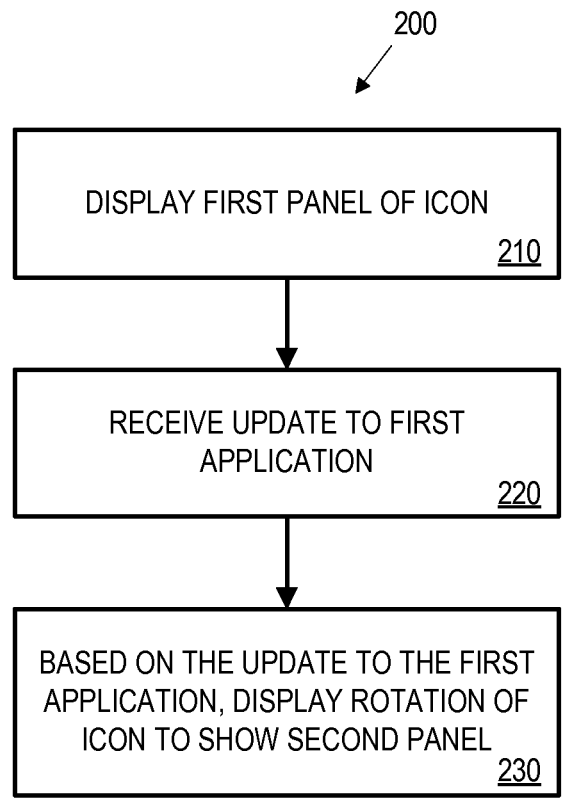
FIG. 2 is a flowchart of an exemplary method for rotating an icon in three dimensions.

FIG. 2 is a flowchart of an exemplary method for displaying the rotations of an icon in three dimensions. In the example, a first panel of the icon is displayed at block 210. The icon can be associated with one or more applications. For example, a panel of the icon can display an image or graphic associated with an application to the user. The application graphic can identify the application so that the user can view what application can be launched or expanded by the panel. An application can be a program or software installed on or available to a computing device or a program or software that provides remote access to software running remotely. At block 220, an update to the first application is received. For example, a game application installed on a device can be updated when data is sent to the device to report a turn taken in the game by a user of a different device. Applications can be updated using a push notification, or some other updating technique. In some implementations, an application can be updated by receiving an event, data (e.g., binary data) or a message using wired, wireless, or internet technologies. A message can include a text message, phone message, photo, video, audio, email, formatted text or other message. Also, an application can receive an incoming signal (e.g., a phone call, or data stream), or an application can pull data for an update. For example, an application can receive pulled data from a server that updates the application. In another implementation, an update can be downloaded to the application. For example, a software update to an application can be downloaded from a server. In some implementations, an update for an application can be a message represented as binary data. In a further implementation, an application can be updated when the application receives data that was not available to the application before receiving the data. For example, the data can be provided from a computing system other than the computing system that the application is installed on. Additionally, an application can be updated based on functionality of the application including a change in the application's state, a notification, alarm, timer, or context information (e.g., location context, or device context). For example, an application that manages appointments can update the application by producing an alarm or notice of a scheduled meeting. An application can be updated when it is not launched or fully launched (e.g., when the application is in an unexpanded or stand-by state). In other examples, an application can be updated while launched. At block 230, the icon is displayed as being rotated in three-dimensions based on the update of the first application. The icon can rotate to display a second panel of the icon that includes an indication of the update to the application. For example, the first and second panel can both be assigned to a single application, such as an email application. The first panel can display an application graphic or image associated with the application. The first panel can be used to launch the email application, and when the email application is updated, the icon can rotate automatically to display the second panel. The second panel can display an image associated with the update (e.g., a subject line for an email received in the update). In some implementations, the second panel can also be used to launch the application. In certain implementations, the icon can be further rotated to reveal multiple additional "virtual" panels as further updates are received. In other words, the icon need not have just two panels (as it would in a physical manifestation of the icon), but can be displayed as having any number of "virtual" panels. In another implementation of an icon, the icon can have multiple panels on one side of the icon. In some implementations, the icon can be displayed in a portion of the display or displayed to fill the entire display.

In another implementation, the second panel is assigned to a different application than the first panel. In this implementation, the icon can be displayed as rotating to show the second panel that is associated with a second application and that further shows an indication of the update. For example, the front and back panels of a tile can be assigned to different applications for social networks. The panel for one of the social network applications is displayed until the icon automatically rotates to display the panel for the second social network application upon update. In another implementation the icon can be manually rotated by user interaction to display the panel for the second social network application. The panel for the second social network application can be updated to show an image that includes an indication of the update to the application.

An indication of an update to an application can include an image or graphic displayed on or next to the panel and can include text (e.g., text characters, formatted text, or character strings), pictures, colors, or other display elements. The indication of the update can change the image or graphic that was displayed by the panel before the update to the application occurred. The change to the displayed panel image can be based on the application update. An indication can also include an animated graphic, video, or photographic image. Further, the indication of the update can include a portion or all of the data received in the update. For example, if a text messaging application receives a text message, the text message or portion of the message can be displayed in the panel (e.g., as a static or scrolling message). Also, the indication of the update can be a predetermined message from the application. For example, if an application has downloaded new content, the indication of the update can display a message that the update added new content such as the message: "New Content has been Downloaded." The indication of the update can be different for different updates. For example, if an application can have both text and photo updates, when a photo update is received the indication of the update can be different than for when a text update is received. Also, the indication of the update can also be the same for different updates. An indication of the update can be a counter. For example, each time an application is updated a panel assigned to the application can display a counter that is incremented to indicate the application was updated multiple times.

The three-dimensional icon can be displayed as rotating about one or more axes of rotation. Rotating an icon about an axis allows for saving viewable space in the display and the icon can rotate without obscuring other images in a display such as other icons. Saving viewable space in the display allows a user to access applications and icons without having to scroll through multiple display screens.

In some implementations, an icon can be displayed as a cube, a tile, a cylinder, a sphere, a polygon, polyhedron, or any other geometric shape. The icon can include sides, or segments (e.g., surface segments) that correspond to panels. For example, a panel of the icon can be a side or surface segment of the icon. In one example, for a cube icon that includes six sides, each of the six sides of the icon can correspond to one panel. For a cylinder that includes a number of surface segments, each of the number of surface segments can be a panel. Some or all of the sides or segments of an icon can be panels. In certain implementations, the number of panels that are associated with the sides of an icon can exceed the number of sides that would be available in a physical manifestation of the icon. For instance, seven or more panels might be associated with a six-sided cube icon, in which case the additional panels would still be shown as being one side of a six-side cube, even though the sides exist only virtually.

The rotation of the three-dimensional icon can be based on or triggered by an update to an application. This allows a user to easily view what applications have been updated. In some implementations, an icon is rotated automatically when an update is received. The receipt of an update can also be signaled by an audible or haptic indication. For example, when an application is updated, a panel assigned to the application can be updated and the icon that includes the panel can rotate to display the updated panel. The automatic rotation can be triggered when the panel is updated or when the application is updated. For example, the icon can rotate before the panel is updated or after the panel is updated. In another implementation the icon can be manually rotated by user input. For example, a user can cause the icon to rotate in a touch screen display by performing a gesture on the touch screen display (e.g., a swipe gesture). In a further example of manual rotation of the icon, the icon can be rotated using accelerometer data or voice input. In yet another implementation, the three-dimensional icon continuously rotates (either in a smooth continuous fashion, or by stopping at each panel for some fixed interval). Such an implementation allows a user to view the existence of updates to multiple applications using a single icon. In some implementations, the rotation of one or more icons to show updates occurs when the computing device transitions from a stand-by state to an active state. For example, one or more updates to an application can be received while a mobile device is in an inactive (e.g., stand-by) state. The receipt of updates can be signaled audibly and/or haptically, even when the device is in this state. Then, when the device is moved to an active state (e.g., via user interaction, such as pressing a key of the device or touching the screen), the display of the device shows the rotation of the one or more icons associated with the received updates (e.g., in a sequence or at least partially simultaneous). In one exemplary implementation of a manual rotation by a user, the user taps on a panel for an application such as a music application and the icon rotates to display another panel indicating the currently playing song, before returning automatically to again display the panel for the music application. In another implementation, the icon is rotated back manually to again display the panel for the music application.

Figure 3A:
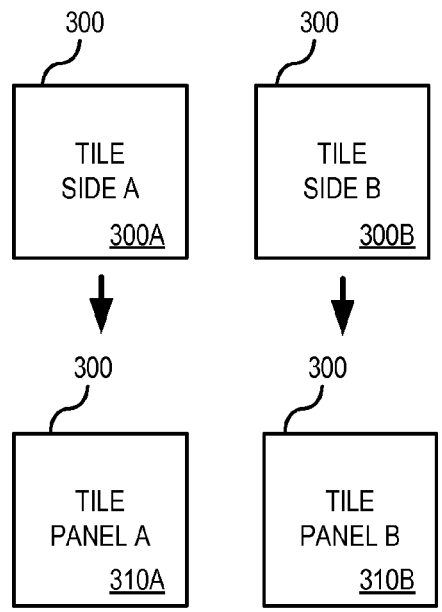
FIG. 3A is a schematic diagram illustrating an exemplary tile-shaped icon.

FIG. 3A is a schematic diagram of an exemplary tile icon 300. The tile icon 300 includes two sides 300A-B, such as a front and back side. The tile icon 300 can display one side while the other side is hidden. The sides of the icon can correspond to a panel that is associated with an application (e.g., the panel can be used to present certain information from an application, to launch the application, or to provide other information about the application). For example, in FIG. 3A, side 300A of the tile icon 300 corresponds to a panel 310A and the other side 300B of the tile icon 300 can correspond to another panel 310B. The panels of the tile icon 300 can be assigned to or associated with an application. For example, the panel of the tile icon can be assigned to an application such that a user can launch the application using the panel of the tile icon. Also for example, a tile icon can have different applications on each panel of the tile icon and the tile icon can rotate or flip to display the panels. The panels of the tile icon can be used to launch the applications that are associated with the panels of the tile icon. As noted, panels of a tile icon that are assigned to an application can be updated when an application is updated so that the panel shows an indication of (or information about) the update. In one implementation, the back panel of a tile icon can be automatically assigned to the same application as the front panel of the icon. In other implementations, however, one or both panels can be assigned to applications manually. In yet another implementation, an application can be assigned to a panel programmatically.

Figure 3B:
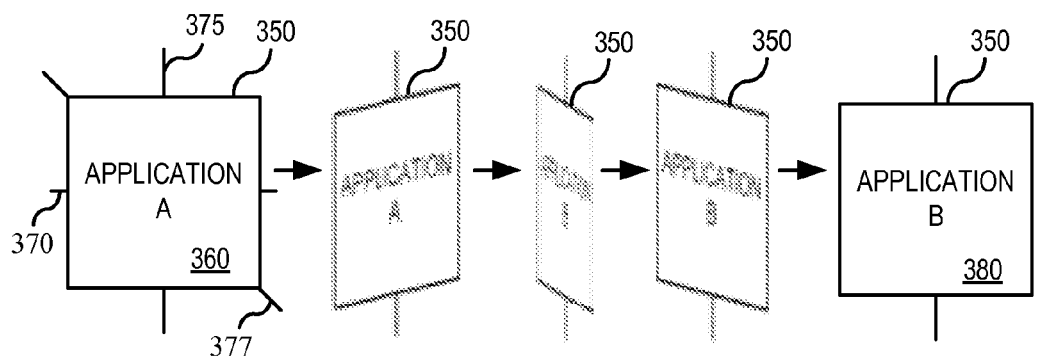
FIG. 3B is a schematic diagram illustrating an exemplary tile-shaped icon rotating in three-dimensions.

FIG. 3B is a schematic diagram illustrating various states of an exemplary tile icon 350 as it is rotated in three-dimensions. As noted above, rotation in three-dimensions is meant to describe a visual appearance of three-dimensional rotation on a two-dimensional display. In the example, the tile icon 350 has an application A assigned to a first panel 360 of the tile icon. The tile icon 350 can rotate around an axis to display or reveal another panel of the tile icon 350. The axis can be a horizontal axis 370, a vertical axis 375, a diagonal axis 377, or some other axis of the tile icon 350. In other implementations the tile can rotate not on an axis. For example, the icon can rotate about an edge and move to a different position in the display.

With reference to FIG. 3B, tile icon 350 initially displays the first panel 360 that is assigned to a first application (in FIG. 3B, Application A). Upon an update to a second application (in FIG. 3B, Application B), the tile icon 350 rotates in three-dimensions around the vertical axis 375 to display a second panel 380 that is assigned to Application B. The vertical axis 375 is shown in FIG. 3B for illustrative purposes, and is typically not displayed. The second panel 380 for Application B can have an indication that Application B was updated. For example, if Application B is an email application, then the second panel 380 assigned to Application B can display an updated graphic or image indicating that the email application received a new email.

Figure 4A:
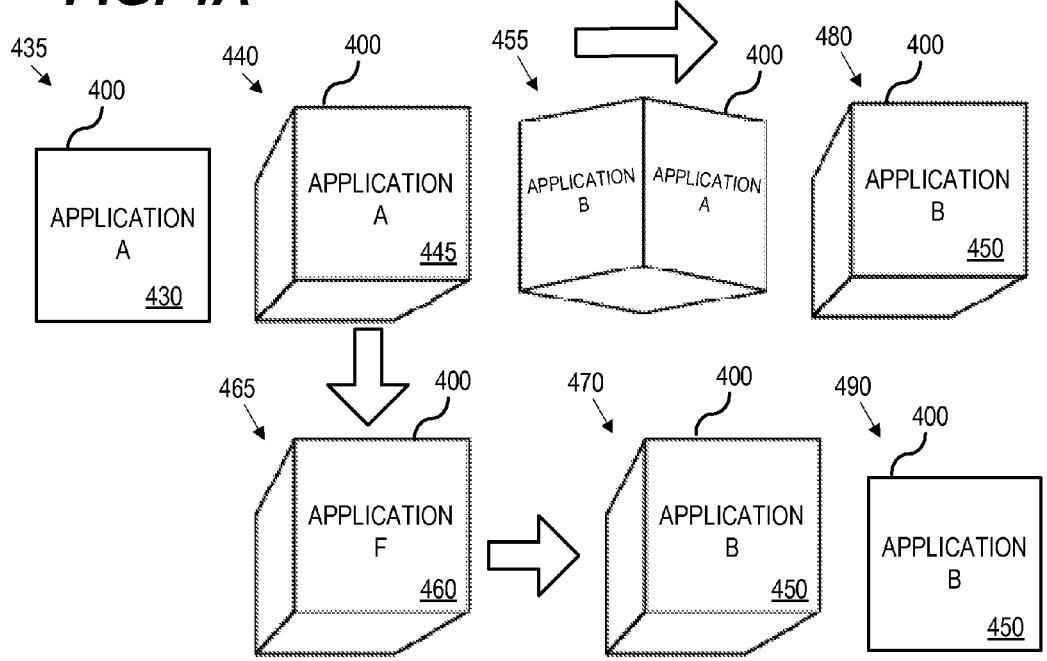
FIG. 4A is a schematic diagram illustrating an exemplary cube-shaped icon.

FIG. 4A illustrates an exemplary cube-shaped icon 400 in various rotational states. In the example the icon 400 can include six sides. The sides of the cube can correspond to panels that can be assigned to an application. The icon 400 can be displayed showing one or more panels. That is to say the icon 400 can be displayed without showing more than one panel (e.g. showing only one panel) as shown at 430. When one panel is shown, and as shown at 435, the icon can appear flat or displayed without showing the icon 400 in perspective. Because panels can be assigned to applications with corresponding graphics or images displayed by the panel, the graphics or images for the application can be displayed as having two or more dimensions even though the icon is displayed as flat. For example, an icon can be displayed as flat, showing only one panel of the icon, and the image displayed by the panel can be a picture of a person. The picture of the person can show the person from a three dimensional perspective.

As shown in 440, and upon a certain event occurring (e.g., being touched by a user or an update occurring in an application associated with the icon), the icon 400 can become active and extend out (or pop out) to have a three-dimensional appearance and to display a portion of one or more of the other sides. As shown at 455, the icon 400 can rotate in three dimensions to display panels. For example, the cube-shaped icon 400 can rotate around a horizontal axis, a vertical axis, or some other axis. In other implementations, the cube-shaped icon 400 does not rotate around an axis. For example, the icon 400 can rotate about an edge or vertex and move in the display. Any other desired rotational animation can also be used.

In the example of FIG. 4A, the icon 400 displays panel 430 as the front facing panel. Panel 430 can be assigned to Application A. The icon 400 can rotate along a vertical axis to bring the panel 450 to the front for display, as shown at 480. For example, when Application B is updated, the icon 400 can rotate to display panel 450 with an indication that Application B has been updated. In another implementation, a user can perform a gesture using a touch screen display that would cause the icon 400 to rotate about an axis to display panel 450.

During rotation of a three-dimensional icon, multiple panels can be viewed. For example, as illustrated at 455, icon 400 can show the panels for both Application A and Application B during rotation. The icon 400 can rotate partially, thereby allowing a user to see what is displayed by an adjacent panel. For example, a user can rotate the icon 400 to the left partially between two panels so that the user can see what is displayed by the two panels (e.g., by touching the icon via a touch screen and making a small leftward gesture while maintaining contact with the touch screen). Also, the user can rotate the icon 400 downward or upward partially between panels to view other panels (e.g., by touching the icon via a touch screen and making a small upward or downward gesture while maintaining contact with the touch screen). When a panel is rotated partially it can be displayed in perspective with the rotating icon. For example, for a panel of an icon for a cube, the perspective of the panel can be according to the perspective of its corresponding side. In other implementations, a panel can be displayed using a different perspective or no perspective.

The icon 400 can rotate up, down, to the left, to the right, or in some other direction. For example, when the icon rotates up or down it can rotate along a horizontal axis, and when the icon rotates to the left or right the icon can rotate along a vertical axis. FIG. 4A shows panel 445 as the front facing panel. If the icon is rotated down, and as shown at 465, then the icon rotates to display panel 460 that is assigned to application F. From the position of displaying panel 460, and as shown at 470, the icon can be rotated to the right to display panel 450 which shares an edge of the cube with panel 460. In certain implementation, after rotation of the icon and after some period of time, the icon 400 can return to its flat state, as shown in 490.

Figure 4B:
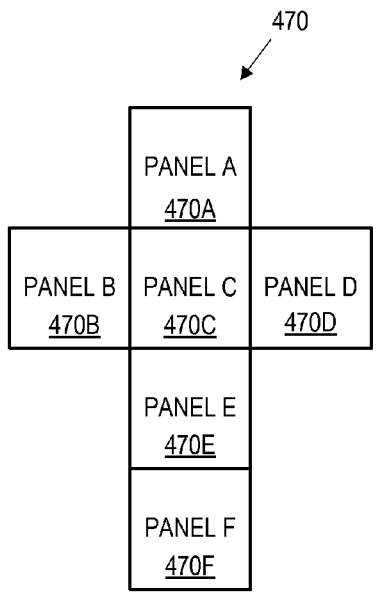
FIG. 4B is a schematic diagram illustrating an unfolded cube-shaped icon.

FIG. 4B is a schematic diagram of an exemplary embodiment of a cube-shaped icon 470 unfolded to lie in two dimensions. The diagram illustrates that the cube has six sides and a side of the cube has four adjacent sides. The adjacent sides share an edge of the cube. The sides have associated panels 470A-F. A panel of the icon can be empty (e.g. unassigned), or a panel can be assigned to an application.

Figure 4C:
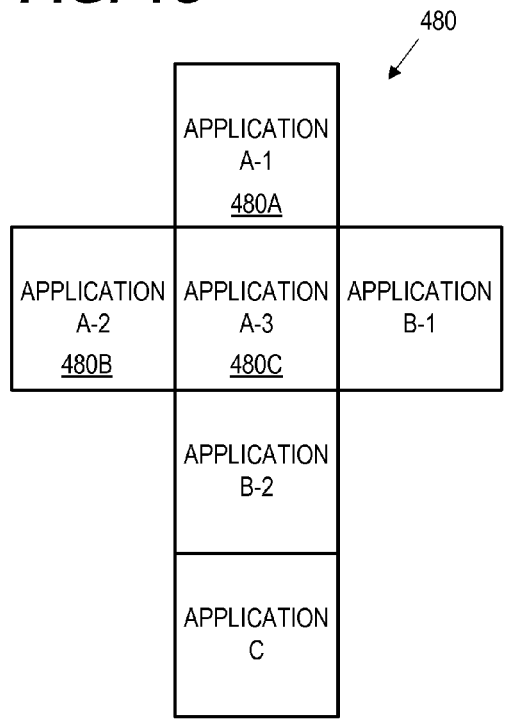
FIG. 4C is a schematic diagram illustrating an unfolded cube-shaped icon with panels assigned to applications.

FIG. 4C is a schematic diagram of another exemplary embodiment of a cube-shaped icon 480 unfolded to lie in two dimensions. As shown in FIG. 4C, an application can be assigned to more than one panel of the icon 480. For example, for a software application such as Application A that includes an email component and a calendar component, one panel 480A of the cube icon 480 can be assigned to the application's email component, one panel 480B of the cube icon 480 can be assigned to the calendar component, and one panel 480C of the cube icon 480 can be assigned to display updates to the application. The updates in the panel can be for more than one component of the application or for one of the components of the application (e.g., only one component). Also, the updates displayed in the panel can be for a component of the application that is not specifically assigned to a panel.

Figure 5A:
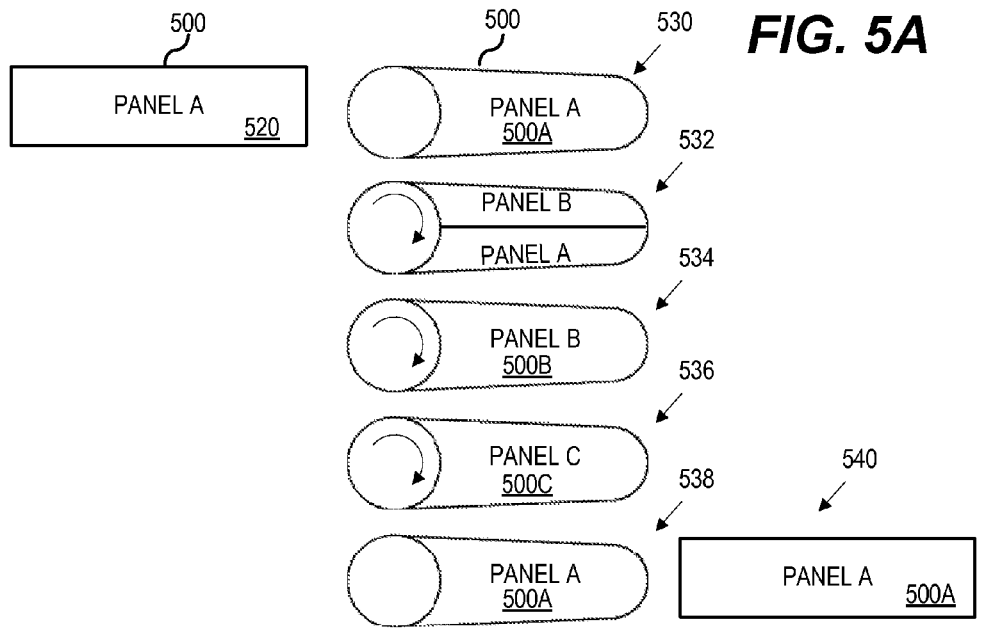
FIG. 5A is a schematic diagram illustrating an exemplary cylinder-shaped icon.

FIG. 5A is a schematic diagram of an exemplary icon 500 having a cylindrical shape. The icon 500 can be displayed as flat, in two dimensions, without showing a side or perspective such as shown at 520. The icon 500 can be activated to extend or pop out (e.g., upon being touched by a user or upon an update occurring to an application associated with the icon) to display a three dimensional representation of a cylinder as shown at 530. The cylindrical icon 500 can have a plurality of panels such as panels 500A-C. A panel for a cylinder can be a portion or segment of the surface for the cylinder. For example, as shown at 530 the panel 500A can be a segment of the surface for the cylinder icon. Any number of panels can be assigned to the cylinder and "virtually" displayed as being part of the same cylinder. The icon for a cylinder can rotate around an axis. For example, the cylinder can rotate around the major axis of the cylinder or some other axis. In another implementation, the icon 500 does not rotate around an axis. For example, the icon can roll or move in the display.

The icon 500 can be displayed as rotating in three dimensions as shown in FIG. 5A. At 530, the icon displays panel 500A. The panels of the icon can be assigned to one or more applications. When the application assigned to panel 500B is updated the icon can rotate from panel 500A to display panel 500B, as shown at 532 and 534. The icon can rotate up or down. Additionally the icon can be oriented vertically instead of horizontally and the icon can rotate to the left or right. The icon can rotate partially between panels to display a portion or all of the panels. The panels can be displayed in perspective with respect to the rotation or cylinder. The icon can continue to rotate down, such as from panel 500B to panel 500C as shown at 536. Because the panels are represented as being on a cylinder, the cylinder can rotate multiple times in one direction and rotate back to a previously displayed panel, as shown at 538. When a panel is shown in perspective it can be withdrawn or flattened to be displayed without perspective. As shown at 540, the icon for the cylinder can be displayed flat and can be viewed as a rectangle or a rectangular representation of the icon 500. The transition to a flat icon can occur, for example, after rotations have stopped and after some period of time. Because the panels can be assigned to applications, the panels can display images or graphics associated with the applications. The graphics or images can be displayed as having two or more dimensions in the image. For example, a flat panel of an icon can display an image for an application that shows a figure in three dimensions.

Figure 5B:
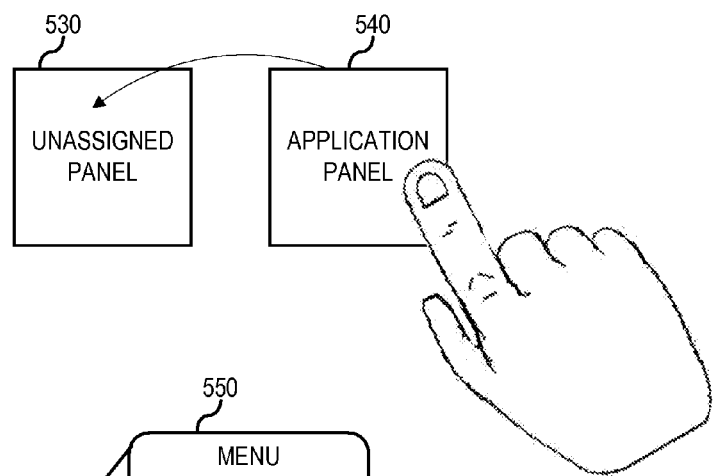
FIG. 5B is a schematic diagram of an exemplary technique for assigning an application to a panel of an icon.

FIG. 5B is a schematic diagram illustrating an exemplary implementation for assigning an application to a panel of an icon 530. In the example, a user drags and drops an application graphic or image 540 for the application onto the panel of the icon 530. When the application graphic or image 540 is dragged and dropped onto the panel for the icon 530, the panel can be an empty panel or the panel can be previously assigned to an application. If the panel is already assigned to an application, then the panel can be reassigned to the different application corresponding to the dragged and dropped application graphic or image 540. When the application graphic or image 540 is dragged and dropped, the configurations previously set for the application graphic or image 540 can update the configurations of the panel. For example, if a panel for a first cube icon displays an email application graphic, the email application graphic can be dragged and dropped onto a panel for a second cube icon to assign the panel of the second cube icon. In one implementation, when an application is assigned to a panel from a different icon panel, the configurations for the panel set in the first icon can be transferred to the second icon panel. In another implementation, the configurations can be changed or set manually.

In other implementations, assigning an application to a panel of an icon can be done manually or automatically. For example, an application can be assigned automatically to a panel of an icon when the application is installed or made available to a device. The application can be installed and an icon displaying a panel assigned to the application can be displayed. In one implementation, the back panel of a tile icon can be automatically assigned to the same application as the front panel of the icon. In another implementation, the back panel can be assigned manually. For example, a tile icon that has both sides assigned to the same application can be changed so that one of the sides is assigned to a different application. In a further example of a manual assignment of an application to a panel, a user can assign an application using a menu for a panel or icon.

Assigning applications to panels of an icon allows users to organize and manage applications efficiently. The user can group applications according to a preference such as by a category, usage, or some other organization preference. Allowing multiple applications to be grouped together can save display space, and allow a user to access multiple applications without having to scroll through various screens of the display.

Figure 5C:
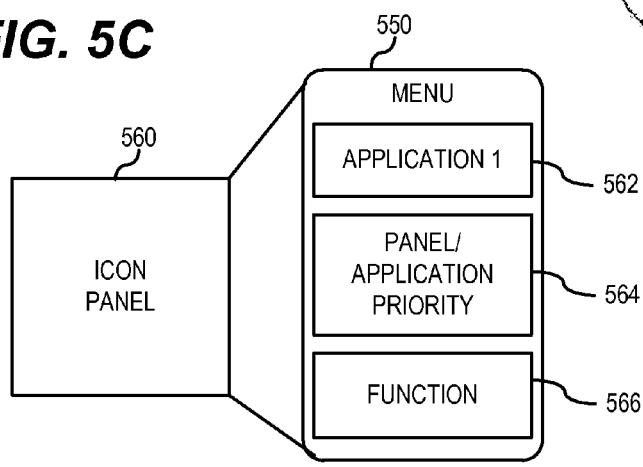
FIG. 5C is a schematic diagram of an exemplary menu for a panel.

FIG. 5C is a diagram of an exemplary menu 550 for a panel 560 of an icon. The panel 560 can have an individual menu for configuring the panel. In another implementation, the menu 550 can be adapted to configure two or more, or all, of the panels for an icon. For example, using a touch screen, a user can activate the menu 550 for configuring panels of an icon by a press and hold gesture on the panel 560. The menu 550 can be activated by other techniques as well (such as selecting a menu icon, selecting the menu from a settings display, or through performance of other gestures). In the illustrated embodiment, the menu 550 can be used to assign an application to the panel 560 (e.g., via application selection window 562). The menu 550 can also be used to assign a component or function of an application to the panel 560 (e.g., via function selection window 566). The menu can be used to assign the panel 560 to display updates or indications of updates from an application. The menu 550 can be used to assign a priority to the panel 560. For example, if an icon has multiple panels assigned to applications, a user can set a priority hierarchy for the panels (e.g., via priority selection window 564). The priority can rank the panels in an order. For example, an order that they should be displayed if their associated applications are updated. Upon updates the panels displayed can be based on the priorities set for the panels and associated applications. For example, when the applications associated with the icon are updated, the panel with the highest priority can be displayed. In one example for a cube icon, the six panels can be given a priority number such as a number of 1-6. For example, the panel with the lowest number can have the highest priority. Other methods of indicating a priority and priority hierarchy can be used.

In another implementation, a priority can be assigned to an application. For example, the applications assigned to the icon can have a priority setting, and the panel assigned to the highest priority application can be displayed when one or more of the applications are updated. Additionally, the menu can have other functionality to configure the panel. For example, the menu can configure rotation speed, growth percentage, deleting, unassigning an application, or other configurable of the panel or icon.

Figure 6:
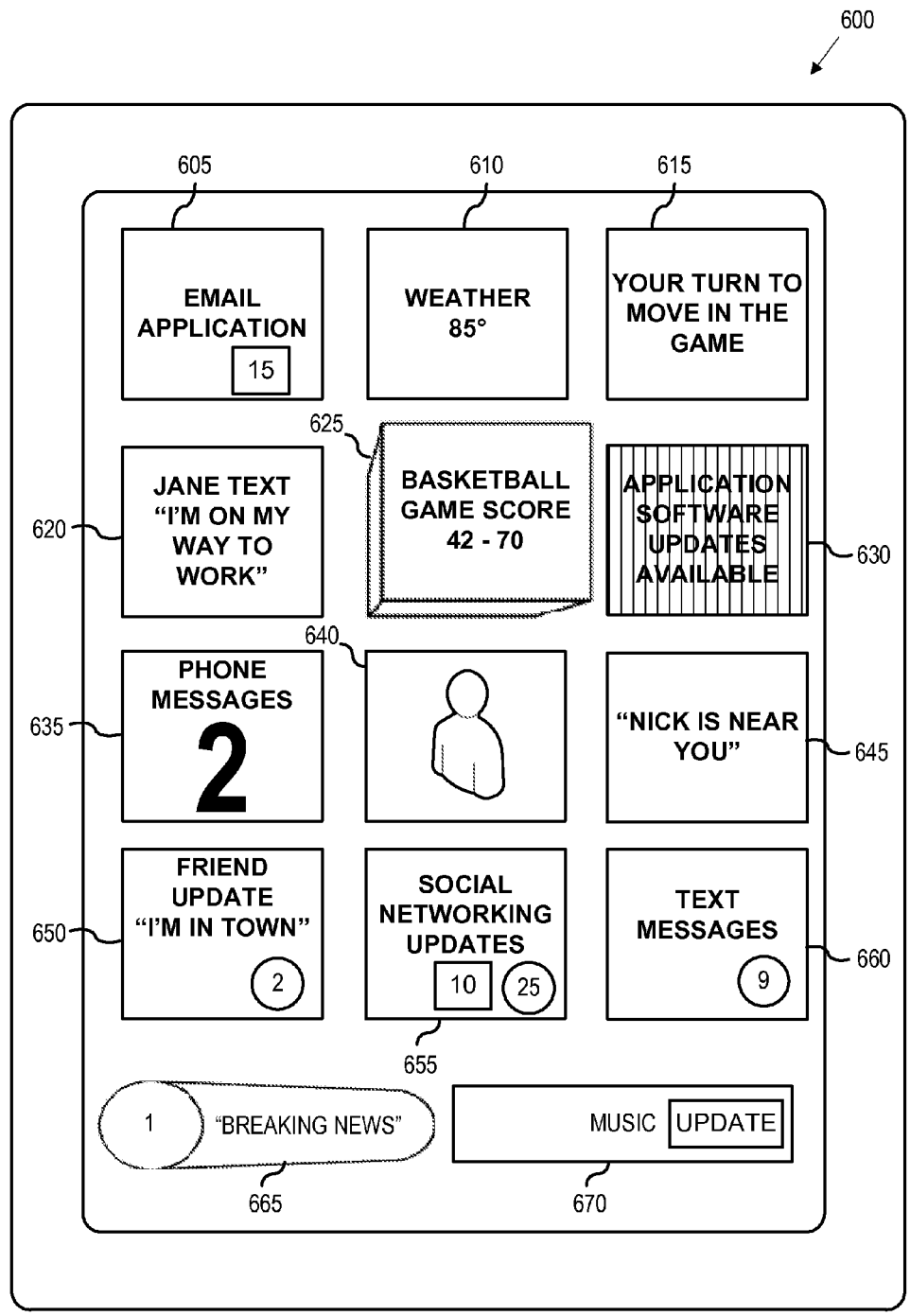
FIG. 6 is a schematic diagram of an exemplary system that can display panels of icons that include indications of updates to applications.

FIG. 6 is a schematic diagram of an exemplary system 600 that displays icon panels that include indications of updates to applications. The visible panel of icon 605, for example, shows an indication that its assigned email application has been updated and received fifteen emails. The visible panel of icon 610 shows an indication that its assigned weather application has been updated with the current local weather of 85°. The visible panel of the tile icon 615 shows an indication that its assigned multi-player game application has been updated because a new turn can be played in the game. The visible panel of cube icon 620 displays the text message that its assigned text messaging application has received as an update. The visible panel of the cube icon 625 shows a score of a game that was sent as an update to a sports application assigned to the panel. The visible panel of icon 630 illustrates by the use of vertical lines that a displayed graphic has a changed color to indicate that an application has received an update reporting that a software update for the application is available for download. The visible panel of icon 635 indicates that a phone messaging application has been updated by receiving two phone messages. The visible panel for icon 640 displays an image or picture that has changed indicating its assigned application has been updated.

The visible panel for icon 645 shows a message from an application indicating that the application was updated with context information (e.g., location context). The update of context information is indicated with the message "NICK IS NEAR YOU." The visible panel for icon 650 indicates that an application component that corresponds to a specified friend has been updated twice and the updates include the displayed message "I'm in town."

The observable panel for icon 655 illustrates an example of a panel indicating that its assigned application has received different types of updates. In the example, the social networking application assigned to the panel for icon 655 has been updated with 10 private messages and 25 public messages. The visible panel for icon 660 shows a counter indicating that the text messaging application assigned to the panel has been updated nine times. The visible panel for the cylinder icon 665 shows that its assigned news application has received an update with breaking news. The visible panel for the cylinder icon 670 (shown in a flat state) displays an indication that its assigned music application has been updated.

Figure 7A:
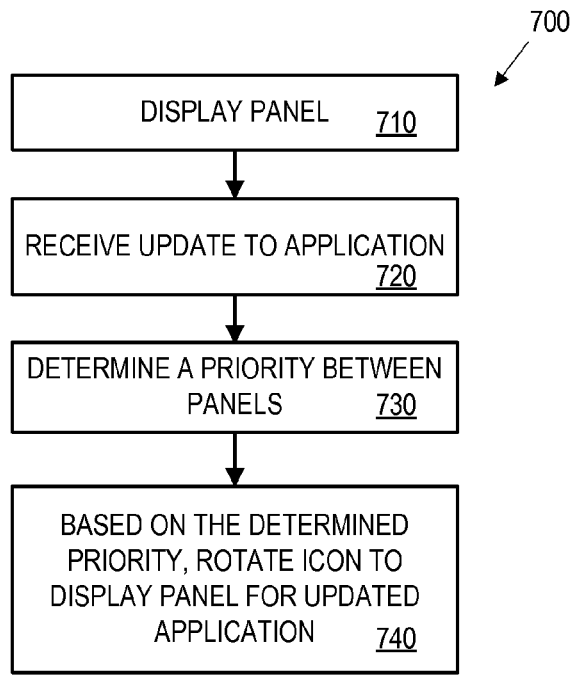
FIG. 7A is a flowchart of an exemplary method of rotating an icon based on a priority.

FIG. 7A is a flowchart of an exemplary process 700 for displaying the rotation of an icon based on a priority. In the example, at block 710, a first panel of an icon assigned to a first application is displayed.

At block 720, an update to a second application is received.

At block 730, a priority between the first panel of the icon and a second panel of the icon assigned to the updated application is determined. For example, the priority for the first panel of the icon can be compared to a priority for a second panel of the icon. In one implementation, the priority set for the first panel can be a lower priority than the priority set for the second panel, in which case a determination can be made that the second panel has priority between the two panels.

At block 740, the icon can be rotated to display the second panel with an indication of the update to the second application based on the determined priority between the panels. In some implementations, if it is determined that a panel has a lower priority than the compared panel's priority, or the same priority as the compared panel's priority, the panel with the lower priority can be displayed for a predetermined duration of time before the icon is rotated back to the higher priority panel.

Figure 7B:
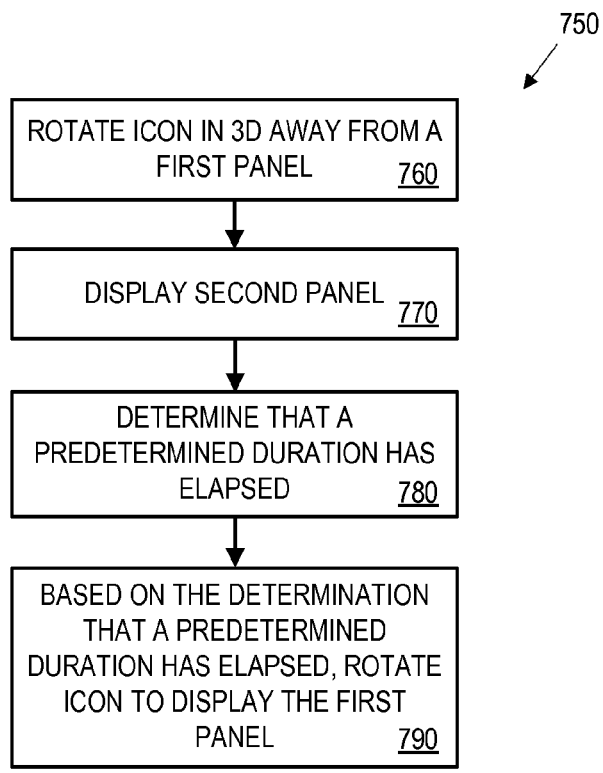
FIG. 7B is a flowchart of an exemplary method of rotating an icon based on an elapsed duration.

FIG. 7B is a flowchart of an exemplary process 750 for displaying the rotation of an icon based on an elapsed duration. In the example, at block 760, an icon is rotated away from a first panel (the icon is rotated so that the first panel is not visible or the most visible panel).

At block 770, a second panel of the icon is displayed. For example, the icon can rotate away from the first panel to display the second panel.

At block 780, a determination is made that a predetermined duration of time has elapsed. For example, the amount of time that has elapsed since the icon rotated to display the second panel can be measured and compared to a predetermined amount of time.

At block 790, the icon is rotated to display the first panel based on the determination that a predetermined duration has elapsed. For example, if a predetermined amount of time is less than or equal to a measured elapsed time that the second panel has been displayed, then the icon can rotate back to the first panel.

As explained above, rotating an icon back to a previously displayed panel can be based on the priorities of the panels. For example, if the previously displayed panel has a higher priority than a second panel that is displayed by rotating the icon, then the icon can display the second panel with an indication of an updated application for a predetermined duration of time before returning the icon to display the previously displayed panel. Further, if the user manually moves an icon to a lower priority panel, then the icon can return to the higher priority panel after a predetermined amount of time using the method of FIG. 7.

Figure 8:
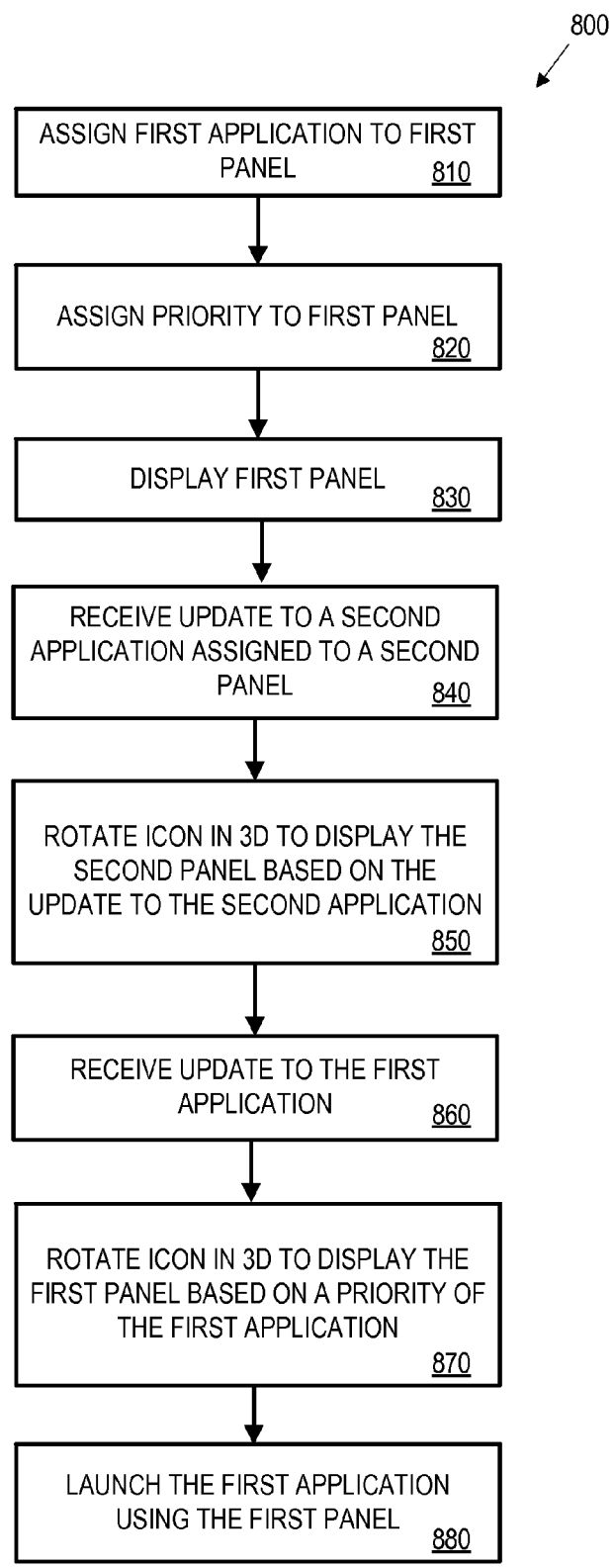
FIG. 8 is a flowchart of an exemplary method of rotating an icon in three dimensions based on an update to an application.

FIG. 8 is a flowchart of an exemplary method for displaying rotation of an icon in three dimensions based on an update to an application. In the example, at block 810, a first application is assigned to a first panel. For example, assignment information or data can be received from a user using a menu for the panel to select an available application to assign to the panel.

At block 820, a priority is assigned to a first panel of an icon. For example, priority information or data can be received from a user using a menu for the first panel to set a priority for the first panel.

At block 830, the first panel of the icon is displayed. For example, the first panel of the icon assigned to the first application can display an image associated with the first application to a user.

At block 840, an update to a second application that is assigned to a second panel of the icon is received. For example, a second panel of the icon that is not displayed can be assigned to a second application that receives an update.

At block 850, the icon is rotated in three dimensions to display the second panel based on the update to the second application. For example, when the second application receives the update, the icon rotates to display the panel assigned to the application to indicate to a user that the application has been updated.

At block 860, an update to the first application is received. For example, after the second application is updated, the first application receives an update.

At block 870, the icon is rotated in three dimensions to display the first panel based on a priority of the first application. For example, if both the first and second applications receive updates and their respective panels can show indications of the updates, the icon rotates to display the panel with the highest priority to the user (in this example, the first panel).

At block 880, the first application can be launched using the first panel. For example, information or data indicating that a user has selected the first application for launch can be received via touch screen. In one example, the first panel can be assigned to a discount provider application and display an indication that the application has been updated with data regarding a discount on a local item or service. A user can select the panel displaying the indication of the updated application to launch the application. The launched application can then provide information about the discounted item or service.

FIG. 9A is a schematic diagram of a computing device 930 displaying an exemplary icon 900 for launching an application ("Application C"). As shown at 902, the icon 900 can display a panel 920 that can be associated or assigned to an application available to or installed on the device 930. As shown at 904, the panel 920 can be selected and the application can be launched and displayed in a launched or running state 910. The panel of the icon can be selected using a keyboard, mouse, trackball, or touch screen. In one implementation using a touch screen, the panel can be launched when a user performs a gesture on the touch screen on or adjacent to the icon 900 or a gesture that otherwise indicates selection of the icon 900. A gesture can include a swipe, a tap, a double tap, a tap and hold, a multi-touch gesture, a pinch, a press, a shape gesture or other gesture. In an implementation using a mouse, a user can click on the panel 920 of the icon 900 to launch the application.

An application can be software installed on or available to a computing device. For example, an application can be an email client, web browser, web application, game, music software, or other installed, accessed, or downloaded software available on a computing device. In some examples, applications can be for providing games, news, social network access, sports information, purchasing information, entertainment, video, movies, television programs, internet access, music, text editors, books, document readers, tools, information, work utilities, organizers, contacts lists, maps, searching, calculators, and other content and functionality. In some instances, and as more fully explained above, an application receives updates. Applications can also provide information, content, and functionality. Launching the application allows for a user to access the functionality, data, information, and content of the application. In some implementations, an application can be running in the background (e.g., in a standby state), and is displayed to the user in the foreground when launched. Launching the application can display screens or windows of the application to the user. In some implementations, a launched application can display a user interface of the application that allows a user to use the application. In some implementations launching an application loads software instructions of the application into memory of a computing device. In another implementation an application can be accessed through a web browser or other internet tool.

FIG. 9B is a schematic diagram of a computing device 940 displaying an exemplary icon 950 that can be increased or decreased in size. At 906, the icon 950 is shown at a first size 960. As shown at 908, the icon 950 can be increased in size, such as size 970. In one example, when the icon 950 increases in size, the icon 950 is displayed in a larger area of the display than before it was increased in size.

In another implementation, the icon 950 can decrease in size so that the size of the icon is displayed in a smaller area of the display than before it was decreased. For example, the icon 950 can be decreased in size from a larger size such as size 970 to a smaller size such as size 960. In another implementation, the icon 950 can be decreased in size to a size smaller than size 960. The icon 950 can be increased or decreased a percentage of its displayed size. Increasing the size of the icon can allow users to better view the icon and its displayed panel or panels. Decreasing the size of the icon can provide for more display area for other icons or content to be viewed by the user.

Exemplary Mobile Device

Figure 10:
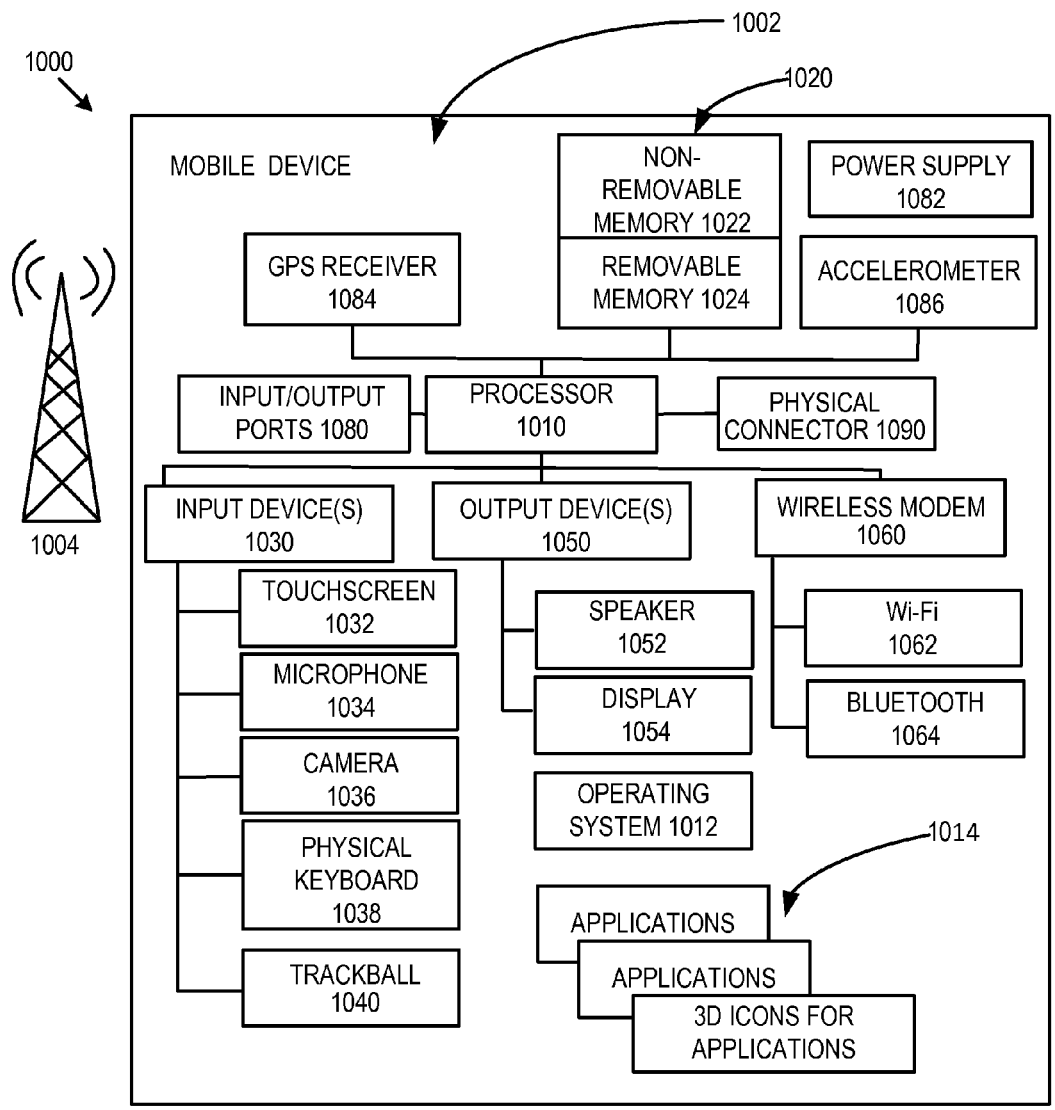
FIG. 10 is a schematic diagram depicting an exemplary mobile device with which any of the disclosed embodiments can be implemented.

FIG. 10 is a system diagram depicting an exemplary mobile device 1000 including a variety of optional hardware and software components, shown generally at 1002. Any of the disclosed embodiment can be implemented by or using such a device. Any components 1002 in the mobile device can communicate with any other component, although not all connections are shown, for ease of illustration. The mobile device can be any of a variety of computing devices (e.g., cell phone, smartphone, handheld computer, tablet computer, slate computer, Personal Digital Assistant (PDA), etc.) and can allow wireless two-way communications with one or more mobile communications networks 1004, such as a cellular or satellite network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs can include common mobile computing applications (e.g., email applications, calendars, contact managers, web browsers, messaging applications), or any other computing application.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. The applications 1014 can include the software for the technologies described herein, such as the display and animation of any of the icons disclosed herein. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth or Wi-Fi). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, a gyroscope, and/or a physical connector 1090, which can be a USB port, IEEE 1394 (FireWire) port, and/or RS-232 port. The illustrated components 1002 are not required or all-inclusive, as any components can be deleted and other components can be added.

Exemplary Implementation Environment

Figure 11:
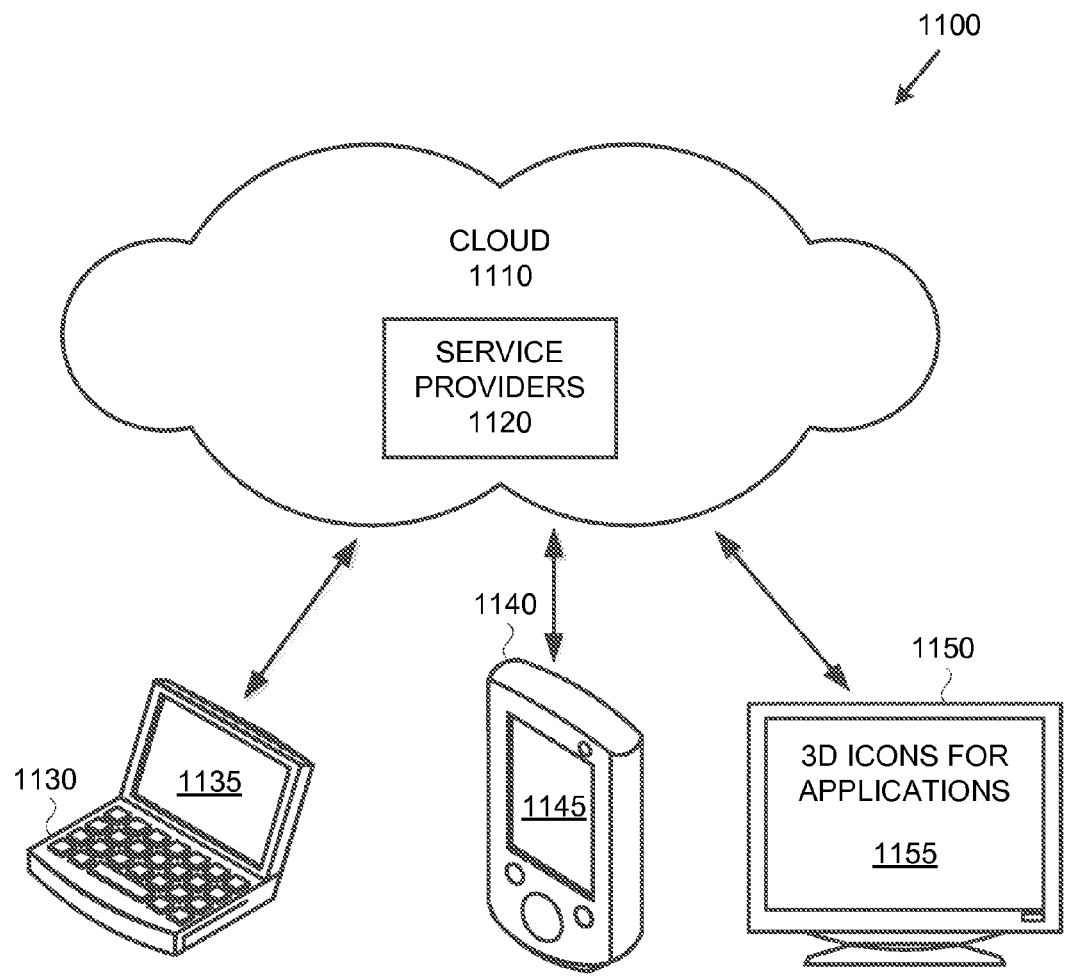
FIG. 11 is a schematic diagram illustrating a generalized example of a suitable implementation environment for any of the disclosed embodiments.

FIG. 11 illustrates a generalized example of a suitable implementation environment 1100 in which any of the described embodiments, techniques, and technologies can be implemented.

In example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Moreover, although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Exemplary Computing Device

The described embodiments, techniques, and technologies can be performed by software and/or hardware of a computing environment, such as a computing device. Suitable computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 12:
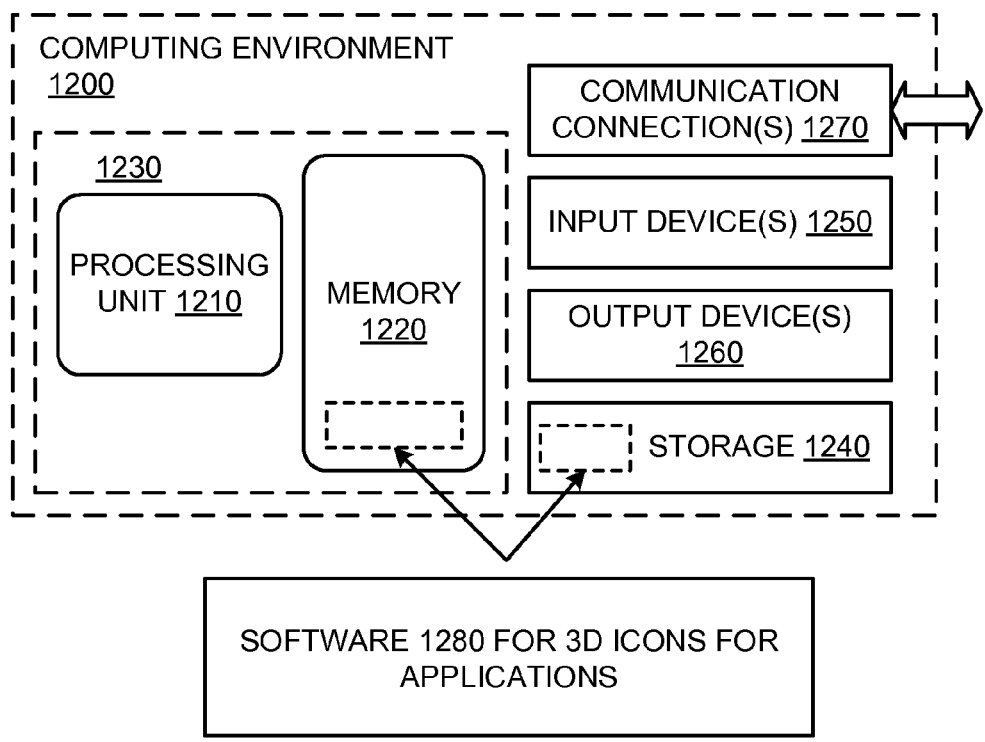
FIG. 12 is a schematic diagram illustrating a generalized example of a suitable computing environment for any of the disclosed embodiments.

FIG. 12 illustrates a generalized example of a suitable computing environment 1200 in which described embodiments, techniques, and technologies can be implemented. The computing environment 1200 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices.

With reference to FIG. 12, the computing environment 1200 includes at least one central processing unit 1210 and memory 1220. In FIG. 12, this most basic configuration 1230 is included within a dashed line. The central processing unit 1210 executes computer-executable instructions. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280 that can, for example, implement the technologies described herein such as icons for applications. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other tangible storage medium which can be used to store information and which can be accessed within the computing environment 1200. The storage 1240 stores computer-executable instructions for the software 1280, which can implement technologies described herein.

The input device(s) 1250 may be a touch input device, such as a keyboard, keypad, mouse, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, or other data in a modulated data signal.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims and their equivalents.

I claim:

1. A method implemented at least in part by a computing device, the method comprising:
   displaying a first panel of an icon, the icon being associated with one or more applications;
   receiving an update to an application of the one or more applications; and
   based on the update to the application, displaying the icon as rotating in three dimensions until a second panel of the icon is displayed, the second panel of the icon displaying an indication of the update to the application, wherein the first and second panels are front and back side panels of the icon, respectively, and relate to the same application with information about the application being on the front side panel and the update being about the application on the back side panel, wherein the rotating occurs automatically in response to the application receiving the update and wherein as a result of the rotation, the front side panel is hidden when the back side panel is displayed, the update being data received by the computing device from a server computer.

2. The method of claim 1, wherein the indication of the update to the application comprises information received by the application, and
   wherein the information received by the application comprises text information, animated graphic information, or photographic image information.

3. The method of claim 1, wherein the application is a first application, and wherein the method further comprises:
   receiving an update to a second application of the one or more applications, the second application being associated with the first panel of the icon; and
   based on a priority assigned to the first panel of the icon, displaying the icon as rotating in three dimensions until the first panel of the icon is displayed, the first panel comprising an indication of the update to the second application.

4. The method of claim 1 further comprising, after a predetermined time and after the second panel of the icon is displayed, displaying the icon as rotating in three dimensions until the first panel of the icon is displayed again.

5. The method of claim 1 further comprising assigning the application to one of the first panel of the icon or the second panel of the icon.

6. The method of claim 5, wherein the assigning the application is based on user input received from an interactive menu associated with the icon.

7. The method of claim 5 further comprising launching the first application in response to user interaction with the first panel.

8. The method of claim 1, wherein the icon is a cube-shaped icon, the cube-shaped icon comprising the first panel as a first side of the cube-shaped icon and the second panel as a second side of the cube-shaped icon.

9. The method of claim 1, wherein the icon is cylinder-shaped icon, the cylinder-shaped icon comprising the first panel as a first surface segment of the cylinder-shaped icon and the second panel as a second surface segment of the cylinder-shaped icon.

10. The method of claim 1, wherein the icon is a tile-shaped icon, the tile-shaped icon comprising the first panel on a first side of the tile-shaped icon and the second panel on a second side of the tile-shaped icon.

11. The method of claim 1 further comprising increasing the size of the icon so that the icon is displayed in a larger area of a display.

12. The method of claim 1 further comprising displaying a plurality of different icons, and wherein the displayed rotation of the icon does not obscure the display of the plurality of different icons.

13. A computing device comprising a processor and a memory, the memory storing computer-executable instructions which when executed by the processor cause the computing device to perform a method, the method comprising:

displaying a first panel of an icon, the icon being associated with one or more applications;

receiving an update to an application of the one or more applications, the update including data received from a server computer; and based on the update to the application, displaying a three-dimensional rotation of the icon that reveals a second panel of the icon, wherein the first panel is a front side of the icon and the second panel is a back side of the icon so that the three-dimensional rotation includes the icon flipping from the front side to the back side of the icon, wherein as a result of the rotation, the front side of the icon is hidden while the back side is displayed, the second panel comprising an indication of the update to the application, the three-dimensional rotation of the icon occurring automatically in response to the application receiving the update.

14. The computing device of claim 13, wherein the indication of the update comprises text, an animated graphic, or a photographic image.

15. The computing device of claim 13, wherein the application is a first application, and wherein the method further comprises:

receiving an update to a second application of the one or more applications, the second application being assigned to the first panel of the icon; and based on a priority assigned to the first panel, displaying a three-dimensional rotation of the icon until the first panel of the icon is displayed, the first panel comprising an indication of the update to the second application.

16. The computing device of claim 13, wherein the method further comprises, after a predetermined time, displaying a three-dimensional rotation of the icon to display the first panel of the icon.

17. The computing device of claim 13, wherein the icon has the shape of a cube, the cube comprising the first panel as a first side of the cube and the second panel as a second side of the cube.

18. The computing device of claim 13, wherein the icon has the shape of a cylinder, the cylinder comprising the first panel as a first surface segment of the cylinder and the second panel as a second surface segment of the cylinder.

19. The computing device of claim 13, wherein the icon has the shape of a tile, the tile comprising the first panel on a first side of the tile and the second panel on a second side of the tile.

20. A computer readable non-volatile storage storing computer-executable instructions which when executed by a computing device cause the computing device to perform a method, the method comprising:

assigning a first application to a first panel of an icon;

assigning a priority to the first panel of the icon;

displaying the first panel of the icon;

receiving an update to a second application, the second application being assigned to a second panel of the icon, the update being received by the computing device from a server computer, the first panel being a front side of the icon and the second panel being a back side of the icon;

in response to the second application receiving the update, automatically rotating the icon in three dimensions to display the second panel, the second panel comprising an indication of the update to the second application, wherein the rotating includes flipping the icon from the front side to the back side so that the front side is hidden when the back side is displayed;

receiving an update to the first application; and based on the priority assigned to the first panel, rotating the icon in three dimensions to display the first panel, the first panel comprising an indication of the update to the first application; and launching the first application in response to user interaction associated with the first panel.

21. A computer readable non-volatile storage storing computer-executable instructions which when executed by a computing device cause the computing device to perform a method, the method comprising:

assigning an application to a first panel of an icon through a drag-and-drop operation by dragging a graphic associated with the application to the first panel and dropping the graphic on the first panel;

receiving an update to the application; and in response to the application receiving the update, automatically displaying the icon as rotating in three dimensions until a second panel of the icon is displayed, the second panel of the icon displaying an indication of the update to the application, wherein both the first and second panels are front and back side panels of the icon, respectively, and wherein the rotating flips the icon from the front panel to the back side panel so that the front panel is hidden from view, the update being data received by the computing device from a server computer.

* * * * *